UNITED STATES PATENT OFFICE.

OTTO B. MAY, OF NEW YORK, N. Y.

SOLID OIL-CONTAINING MEDICINE.

1,000,423.

Specification of Letters Patent. Patented Aug. 15, 1911.

No Drawing. Application filed March 5, 1910, Serial No. 547,415. Renewed January 5, 1911. Serial No. 601,000.

*To all whom it may concern:*

Be it known that I, OTTO B. MAY, a subject of the Emperor of Germany, residing at New York, in the borough of Manhattan, county and State of New York, have invented certain new and useful Improvements in Solid Oil-Containing Medicine, of which the following is a full, clear, and exact specification.

My invention relates to certain new and useful improvements in medicinal oils and oil products, both fatty and volatile, in a dry state, and also to the method of producing the same, and it is particularly adapted for use in connection with the so-called medicinal oils. Many of said oils, such, for instance, as castor oil, olive oil, and cod liver oil, are particularly unpalatable and repulsive to many persons, so that their use, even in the form of an emulsion, is attended by nausea, and in many cases is wholly impracticable. In certain cases it has been found possible to produce these oils in a pulverulent form by combining them with burnt magnesia and the like, but such products are of limited utility by reason of the laxative properties contributed by the magnesium constituent.

It is the object of my invention to overcome this objection and to prepare for internal use the medicinal oils, in a dry state, unimpaired and unaccompanied by any such objectionable properties, and by the method about to be described I am enabled to obtain the desired results and produce a product which, in addition to the oil constituent, contains nothing deleterious, but is simply a healthful, easily digestible food product which is palatable under all circumstances.

By treating ordinary starch, certain soluble products are obtainable therefrom, such, for instance, as the product generally known as soluble starch, or the product obtained by treating ordinary starch with acid, as in the manufacture of dextrose, and arresting the process before completion. Such products differ from starch in that they are readily soluble in water, and also differ from glucose in that they exist in a perfectly dry state. One such product which I find can be used to advantage is that described and claimed in United States Letters Patent No. 855,599, granted to Theodore B. Wagner, June 4, 1907.

I have found that by combining medicinal oils with a starch product such as above described, and with albumins such as casein or gluten or the like, the oils are brought into a dry state, in which they can be readily taken by persons and retained by the most sensitive stomachs. In this way as much as thirty-three per cent. of an oil can be incorporated into the mediums I have named, and inasmuch as the medium itself is a nutritious and easily digestible substance, my product will be found preferable to emulsions or other compounds which contain other ingredients, which, if not actually deleterious, constitute mere useless ballast.

One method of carrying out my invention is as follows: Thirty-three parts of the starch product referred to above are dissolved in sixty parts of water, and there are then added thereto thirty-three parts of gluten. To this are added thirty-three parts of the oil it is desired to incorporate, and the mixture is slowly dried by heating at 80° cent. The resultant product can then be ground or formed into tablets or the like, and when desired a suitable aromatic or flavoring substance, or other medicinal substance may be incorporated before or after drying.

It will be understood that while pure, untreated oils may be employed as above, my invention also contemplates the use of oils which have been subjected to modifications or treatments, such, for instance, as the iodization of the oil or the like.

It will also be understood that various modifications may be made in the preparation of the substances, as well as in other features of my invention, without departing from the spirit thereof, and I do not intend to limit myself to the exact preparation or features above described, but

What I claim and desire to secure by Letters Patent is:

1. The method of producing an oil-containing medicine consisting in mixing oil and gluten with a solution of soluble starch and evaporating the mixture to dryness.

2. The method of producing dry oil-containing medicinal compositions, consisting in dissolving a soluble starch product in water, adding an albuminous substance thereto, then adding the oil to the mixture thus produced, and then slowly drying the resultant product.

3. The method of producing dry oil-containing medicinal compositions, consisting in dissolving thirty-three parts of modified starch in water, adding thirty-three parts of an albuminous substance thereto, then adding thirty-three parts of oil to the mixture thus produced, and then drying the resultant product.

4. A solid oil-containing medicine comprising soluble starch, gluten and medicinal oil substantially as described.

5. A solid oil-containing medicine containing soluble starch, an albuminous substance and a fixed medicinal oil substantially as described.

6. A solid oil-containing medicine containing one part of soluble starch, one part of gluten and one part of fixed medicinal oil substantially as described.

In witness whereof I have hereunto set my hand in the presence of two subscribing witnesses.

OTTO B. MAY.

Witnesses:
ALEXANDER V. MORGENSTERN,
ALFRED SPOTZ.